(12) United States Patent
Furuichi et al.

(10) Patent No.: US 11,301,976 B2
(45) Date of Patent: Apr. 12, 2022

(54) INSPECTION SUPPORT SYSTEM, LEARNING DEVICE, AND DETERMINATION DEVICE

(71) Applicant: CHIYODA CORPORATION, Yokohama (JP)

(72) Inventors: Kazuya Furuichi, Yokohama (JP); Akihito Ikarashi, Yokohama (JP); Shizuka Ikawa, Yokohama (JP); Kenichi Mimura, Yokohama (JP)

(73) Assignee: CHIYODA CORPORATION, Yokohama (JP)

( * ) Notice: Subject to any disclaimer, the term of this patent is extended or adjusted under 35 U.S.C. 154(b) by 0 days.

(21) Appl. No.: 16/825,230

(22) Filed: Mar. 20, 2020

(65) Prior Publication Data

US 2020/0234425 A1 Jul. 23, 2020

Related U.S. Application Data

(63) Continuation of application No. PCT/JP2018/041847, filed on Nov. 12, 2018.

(30) Foreign Application Priority Data

Nov. 21, 2017 (JP) .............................. JP2017-223312

(51) Int. Cl.
*G06T 7/00* (2017.01)
*G06K 9/00* (2022.01)
(Continued)

(52) U.S. Cl.
CPC ........ *G06T 7/0002* (2013.01); *G06K 9/00201* (2013.01); *G06K 9/6256* (2013.01); *G06N 3/08* (2013.01)

(58) Field of Classification Search
None
See application file for complete search history.

(56) References Cited

U.S. PATENT DOCUMENTS

2005/0117700 A1 6/2005 Peschmann
2013/0113914 A1 5/2013 Scheid et al.
(Continued)

FOREIGN PATENT DOCUMENTS

GB 2362711 A 11/2001
JP H0518904 A 1/1993
(Continued)

OTHER PUBLICATIONS

International Search Report corresponding to Application No. PCT/JP2018/041847; dated Jan. 29, 2019.
(Continued)

*Primary Examiner* — Leon Flores
(74) *Attorney, Agent, or Firm* — Cantor Colburn LLP

(57) ABSTRACT

An inspection support system comprising: determination devices that determine pass or fail based on a result of non-destructive inspection of the object; and a learning device that learns a determination algorithm used to determine pass or fail based on information collected from the determination devices. The determination device transmits an ultimate determination result yielded by an inspection person who has checked a determination result to the learning device along with the corresponding result of non-destructive inspection of the object. The learning device includes: a determination result reception unit that receives the ultimate determination result and the result of non-destructive inspection of the inspection object; a learning unit that learns the determination algorithm based on
(Continued)

received information; and a provision unit that provides the learned determination algorithm to the determination devices.

9 Claims, 2 Drawing Sheets

(51) Int. Cl.
*G06K 9/62* (2022.01)
*G06N 3/08* (2006.01)

(56) References Cited

U.S. PATENT DOCUMENTS

| | | | |
|---|---|---|---|
| 2013/0243244 A1 | 9/2013 | Miyamoto et al. | |
| 2017/0032281 A1* | 2/2017 | Hsu | B23K 31/125 |
| 2018/0307946 A1 | 10/2018 | Kuroda et al. | |

FOREIGN PATENT DOCUMENTS

| | | |
|---|---|---|
| JP | 2013192624 A | 9/2013 |
| JP | 2014070944 A | 4/2014 |
| JP | 2017142739 A | 8/2017 |
| WO | 2017073373 A1 | 5/2017 |
| WO | 2017081984 A1 | 5/2017 |

OTHER PUBLICATIONS

International Preliminary Report on Patentability and Written Opinion of the International Searching Authority; International Application No. PCT/JP2018/041847; dated May 26, 2020; 15 pages.
EPO Extended Search Report for corresponding EP Patent Application No. 18880256.5, dated Apr. 20, 2021.
JPO Notification of Reasons for Refusal for corresponding JP Application No. 2017-223312; dated Feb. 2, 2021.
Orphan, et al. "Advanced y ray technology for scanning cargo containers", Applied Radiation and Isotopes, Elsevier, Oxford GB, vol. 63 No. 5-6, Nov. 1, 2005, pp. 723-732.
Visser Wicher et al., "Automated comparison of X-ray images for cargo scanning", 2016 IEEE International Carnahan Conference on Security Technology (ICCST), IEEE, Oct. 24, 2016, pp. 1-8.
JPO Decision of Refusal for corresponding JP Application No. 2017-223312; dated Jun. 29, 2021.
IPIN Office Action for corresponding IN Application No. 202037010793; dated Feb. 28, 2022.

* cited by examiner

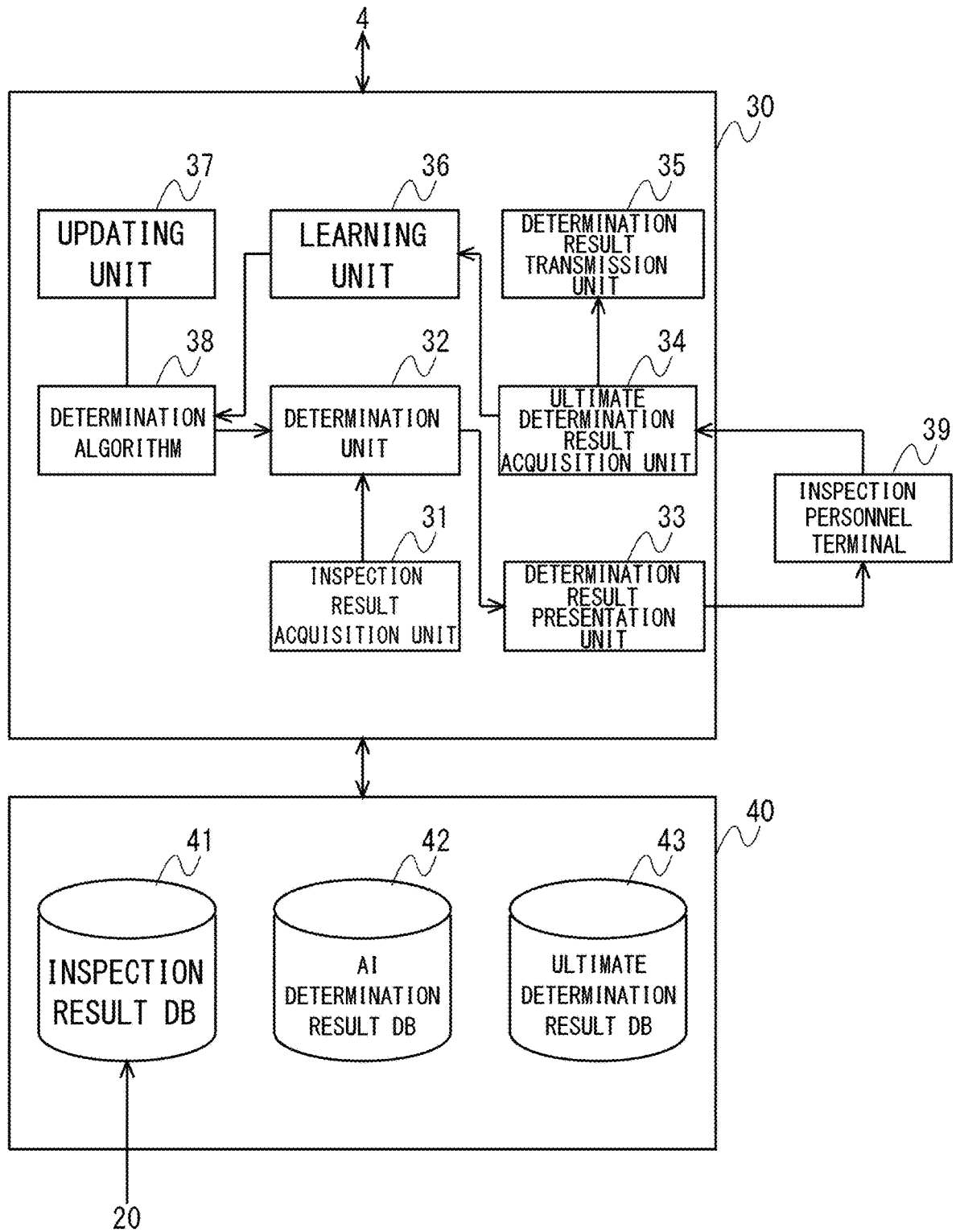

INSPECTION SUPPORT SYSTEM, LEARNING DEVICE, AND DETERMINATION DEVICE

CROSS REFERENCE TO RELATED APPLICATIONS

This application is a continuation under 35 U.S.C. § 120 of PCT/JP2018/041847, filed Nov. 12, 2018, which is incorporated herein reference and which claimed priority to Japanese Application No. 2017-223312, filed Nov. 21, 2017. The present application likewise claims priority under 35 U.S.C. § 119 to Japanese Application No. 2017-223312, filed Nov. 21, 2017, the entire content of which is also incorporated herein by reference.

BACKGROUND OF THE INVENTION

1. Field of the Invention

The present invention relates to an inspection support system for supporting non-destructive inspection of an object, and a learning device and a determination device that can be used in the inspection support system.

2. Description of the Related Art

In building a plant for producing chemical products or industrial products, an enormous amount of objects such as pipes need be inspected. In radiographic testing (RT) performed to inspect welded parts of pipes, for example, a qualified inspection person visually inspects 100000-1000000 images to determine pass or fail. A heavy load is imposed on the inspection person, and numerous steps are required. Accordingly, the inspection could become a rate-controlling step in the plant construction.

A technology for detecting a welded part of a steel pipe is known as a technology to support such non-destructive inspection (see patent document 1 (JP5-18904)). The welded-part detection method disclosed in cited document 1 involves rotating a steel pipe in the circumferential direction and using a TV camera to extract a video signal showing the internal surface of the pipe. Intra-pipe image feature amount having a value unique to the pipe type is extracted from the obtained video signal, and a welded part is detected by discriminating between a welded part and a base part through the use of a neural network having learned the internal image feature amount unique to the pipe type that should be detected.

SUMMARY OF THE INVENTION

In the welded-part detection method disclosed in patent document 1, the operator selects a signal waveform feature amount that should be learned and feeds a signal indicating a welded part or a base part to the neural net learning device to induce learning. Accordingly, the method has a problem in that the job often depends on individual skills. The efficiency of learning in the neural network learning device depends on the skill and the amount of work of the operator responsible for the learning so that efforts to ease the burden on the operator have limitations.

The invention addresses the above-described issue, and a general purpose thereof is to provide technology for improving the efficiency of non-destructive inspection of objects.

An inspection support system according to an embodiment of the present invention is for supporting non-destructive inspection of an object and includes: a plurality of determination devices that determine pass or fail based on a result of non-destructive inspection of the object; and a learning device that learns a determination algorithm used to determine pass or fail in the plurality of determination devices, based on information collected from the plurality of determination devices. The determination device includes; an inspection result acquisition unit that acquires a result of non-destructive inspection of the object; a determination unit that determines pass or fail based on the result of non-destructive inspection of the object acquired by the inspection result acquisition unit using the determination algorithm; a determination result presentation unit that presents the determination result yielded by the determination unit to an inspection person who performs non-destructive inspection of the object; and a determination result transmission unit that acquires an ultimate determination result yielded by the inspection person who checks the determination result yielded by the determination unit and that transmits the ultimate determination result to the learning device along with the result of non-destructive inspection of the object corresponding to the ultimate determination result. The learning device includes: a determination result reception unit that receives the ultimate determination result yielded by the inspection person and the result of non-destructive inspection of the object corresponding to the ultimate determination result; a learning unit that learns the determination algorithm based on information received by the determination result reception unit; and a provision unit that provides the determination algorithm learned by the learning unit to the plurality of determination devices.

Another embodiment of the present invention relates to a learning device. The device includes: a determination result reception unit that receives, from a plurality of determination devices for determining pass or fail based on a result of non-destructive inspection of an object, an ultimate determination result yielded by an inspection person who has checked a determination result yielded by the determination device and the result of non-destructive inspection of the object corresponding to ultimate the determination result; a learning unit that learns a determination algorithm used in the plurality of determination devices to determine pass or fail, based on information received by the determination result reception unit; and a provision unit that provides the determination algorithm learned by the learning unit to the plurality of determination devices.

Still another embodiment of the present invention relates to a determination device. The device includes: an inspection result acquisition unit that acquires a result of non-destructive inspection of an object; a determination unit that determines pass or fail based on the result of non-destructive inspection of the object acquired by the inspection result acquisition unit using the determination algorithm, the determination algorithm being provided from a learning device for learning the determination algorithm used to determine pass or fail, a determination result presentation unit that presents the determination result yielded by the determination unit to an inspection person who performs non-destructive inspection of the object; and a determination result transmission unit that acquires an ultimate determination result yielded by the inspection person who has checked the determination result yielded by the determination unit and that transmits the ultimate determination result to the learning device along with the result of non-destructive inspection of the object corresponding to the ultimate determination result.

Optional combinations of the aforementioned constituting elements, and implementations of the invention in the form of methods, apparatuses, systems, recording mediums, and computer programs may also be practiced as additional modes of the present invention.

BRIEF DESCRIPTION OF THE DRAWINGS

FIG. 2 shows a configuration of the determination device according to the embodiment.

DETAILED DESCRIPTION OF THE INVENTION

Figure 1:
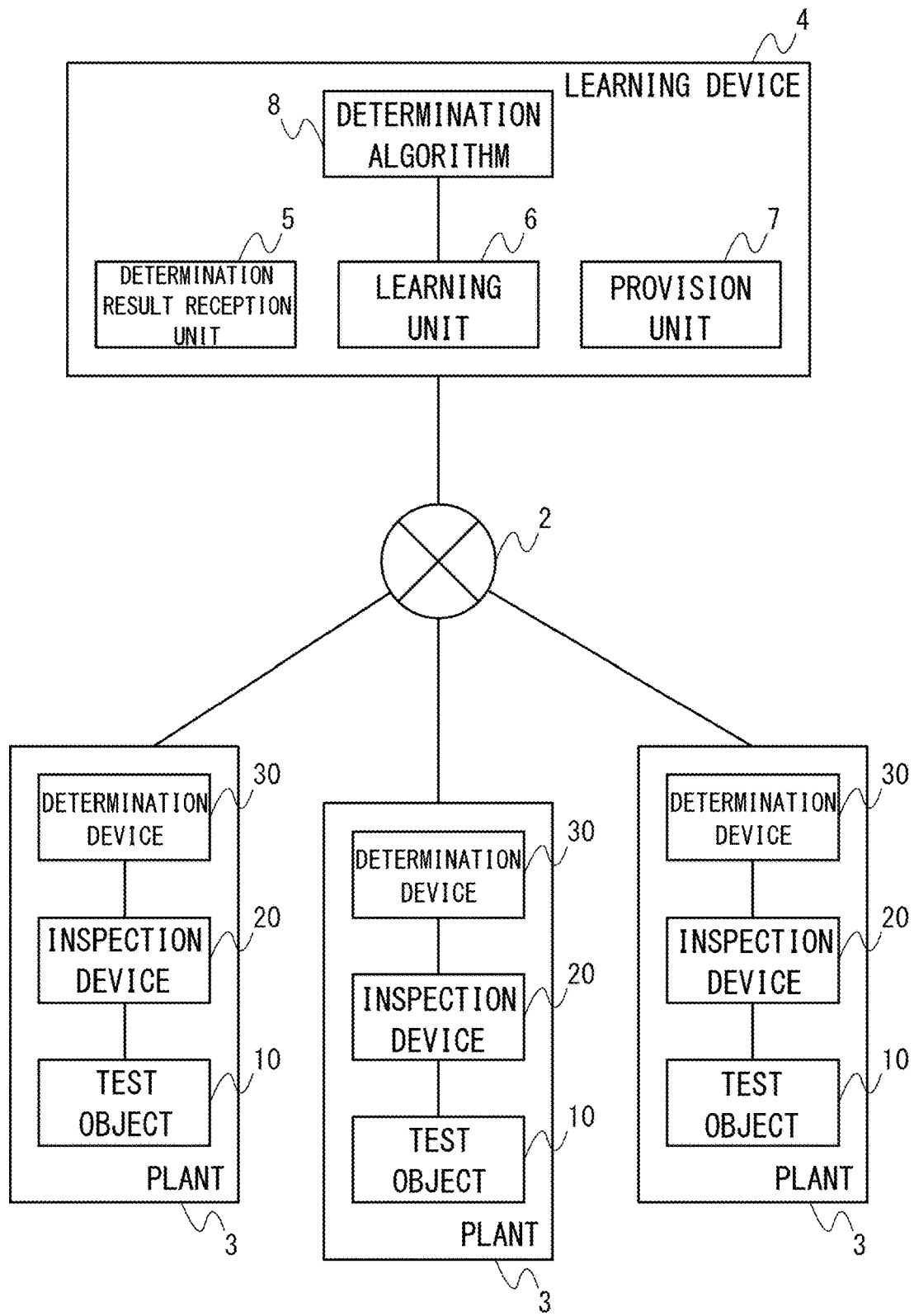
FIG. 1 shows an overall configuration of an inspection support system according to the embodiment.

FIG. 1 shows an overall configuration of an inspection support system according to the embodiment. An inspection support system 1 for supporting non-destructive inspection of an object includes a plant 3 for producing a chemical product or a n industrial product and a learning device 4 for causing a determination algorithm 8 to learn determination based on information collected from a plurality of plants 3, the determination algorithm being used in the plurality of plants 3 to determine pass or fail in non-destructive inspection. Each of the plants 3 includes an inspection object 10 such as a welded part of a pipe installed in the plant 3, an inspection device 20 for performing non-destructive inspection of the inspection object 10, and a determination device 30 for determining pass or fail based on a result of non-destructive inspection of the inspection object 10 performed by the inspection device 20 using the determination algorithm 8 and for presenting a result of determination to an inspection person who performs non-destructive inspection of the object. Each of the plants 3 and the learning device 4 are connected by the Internet 2.

The determination device 30 transmits an ultimate determination result yielded by the inspection person who checked the result of determination yielded by the determination device 30 to the learning device 4, along with the result of non-destructive inspection of the object corresponding to the ultimate determination result.

The learning device 4 includes a determination result reception unit 5, a learning unit 6, a provision unit 7, and a determination algorithm 8. The features are implemented in hardware components such as a CPU and a memory in an arbitrary computer, a program loaded into the memory, etc. The figure depicts functional blocks implemented by the cooperation of these elements. Therefore, it will be understood by those skilled in the art that the functional blocks may be implemented in a variety of manners by hardware only, software only, or by a combination of hardware and software.

The determination result reception unit 5 receives, from the plurality of plants 3, the ultimate determination result yielded by the inspection person and the result of non-destructive inspection of the object corresponding to the ultimate determination result. The learning unit 6 learns the determination algorithm 8 based on the information received by the determination result reception unit 5. The provision unit 7 provides the determination algorithm 8 learned by the learning unit 6 to the determination device 30 of the plurality of plants 3.

The figure shows the learning device 4 as a standalone device to simplify the description, but the learning device 4 may be implemented by a plurality of servers by using a cloud computing technology or a distributed processing technology. This enables learning the determination algorithm 8 by processing a large volume of information collected from the plurality of plants 3 at a high speed and so significantly reduces the time required to improve the precision of the determination algorithm 8.

FIG. 2 shows a configuration of the determination device according to the embodiment. The determination device 30 includes an inspection result acquisition unit 31, a determination unit 32, a determination result presentation unit 33, an ultimate determination result acquisition unit 34, a determination result transmission unit 35, a learning unit 36, an updating unit 37, and a determination algorithm 38. These features may also be implemented in a variety of manners by hardware only, software only, or by a combination thereof.

An inspection result database 41, an AI determination result database 42, and an ultimate determination result database 43 are stored in a local data server 40.

The inspection result acquisition unit 31 acquires the result of non-destructive inspection of the inspection object 10. The result of non-destructive inspection of the inspection object 10 performed by the inspection device 20 is stored in the inspection result database 41. In the case of radiographic testing, for example, the radiograph captured and developed by the inspection device 20 is stored in the inspection result database 41. The inspection result acquisition unit 31 reads the inspection result from the inspection result database 41.

The determination unit 32 determines pass or fail based on the result of non-destructive inspection of the inspection object 10 acquired by the inspection result acquisition unit 31 using the determination algorithm 38. In the case of radiographic testing, for example, the determination algorithm 38 learns image patterns characteristic of various damages or defects that could occur in a welded part (e.g., poor penetration, poor fusion, blow holes, pipes, slag inclusions, cracks, tungsten inclusion, etc.). The determination unit 32 detects a characteristic image pattern like this located in an image and determines pass or fail by checking the type, dimension, etc. of the detected damage against the inspection standard. The determination unit 32 stores the determination result in the AI determination result database 42.

The determination result presentation unit 33 reads the determination result yielded by the determination unit 32 from the AI determination result database 42 and presents the result on a display device of an inspection person terminal 39 used by the inspection person who performs non-destructive inspection of the object. This allows non-destructive inspection, such as radiographic testing that determines the properness of welding by using an X-ray image of the welded part, to be performed such that an automatic determination of pass or fail is made to discriminate an object that is suspected to fail, prior to an ultimate determination of pass or fail made through visual inspection by the inspection person. Accordingly, the efficiency and precision of non-destructive inspection can be improved. Further, the inspection person need only make a determination in images in a gray zone in which it is difficult to determine pass or fail in the automatic preliminary determination by the determination unit 32. Therefore, the steps that should be performed by the inspection person can be radically reduced. This can reduce the load on individual inspection persons radically and reduce the manpower cost. The approach can also inhibit variation in the results of determination caused by a difference in the skill of individual inspection persons and so can improve the precision of non-destructive inspection.

The ultimate determination result acquisition unit 34 acquires the ultimate determination result yielded by the inspection person who checked the result of determination by the determination unit 32 from the inspection person terminal 39. The determination result transmission unit 35 transmits the ultimate determination result acquired by the ultimate determination result acquisition unit 34 to the learning device 4, along with the result of non-destructive inspection of the inspection object 10 corresponding to the ultimate determination result. The ultimate determination result acquisition unit 34 may further acquire a comment by the inspection person from the inspection person terminal 39, and the determination result transmission unit 35 may further transmit the comment by the inspection person to the learning device 4. In this case, the comment by the inspection person may be used in learning in the determination algorithm 8 in the learning device 4. This can further improve the precision of the determination algorithm 8.

In this way, the inspection result of the non-destructive inspection performed in the plurality of plants 3 and the ultimate determination result yielded by the qualified inspection person are aggregated in the learning device 4 to learn the determination algorithm 8. In this way, learning data for learning the determination algorithm 8 can be instantaneously imported into the learning device 4 and used to learn the determination algorithm 8 without being affected by the time or location of non-destructive inspection. Accordingly, the speed of improvement of the precision of the determination algorithm 8 is accelerated. Further, far more voluminous and diversified information is collected and used to learn the determination algorithm than in the case of learning the determination algorithm independently in individual plants 3. Accordingly, the learning efficiency and learning speed of the determination algorithm can be radically improved and the precision of the determination algorithm can be improved in an accelerated manner.

The type and pattern of damages that can easily occur vary depending on the type, location, country, region, weather condition, diameter and quality of the pipe used, etc. of the plant 3. In the case of learning the determination algorithm in individual plants 3 on their own, the algorithm to determine (identify) damages that had occurred numerously in a given plant 3 may be developed to a high precision, but, on the other hand, the algorithm for determining damages that had hardly occurred in the plant 3 may not be developed and remain unable to make a determination. According to the inspection support system 1 of the embodiment, information from a plurality of plants 3 are aggregated to learn the determination algorithm. Accordingly, a highly precise determination algorithm capable of detecting a variety of damages properly and determining pass or fail can be generated in a short period of time.

To improve the precision of the determination algorithm 8, it is particularly important to learn cases in which the determination algorithm 8 has made a false determination and cases in which the determination algorithm 8 has not been able to make a determination. Accordingly, when the determination result yielded by the determination unit 32 is corrected by the inspection person, the determination result transmission unit 35 acquires the corrected determination result and transmits the corrected determination result to the learning device 4 along with the result of non-destructive inspection of the inspection object 10 corresponding to the corrected determination result. In this way, the erroneous algorithm in the determination algorithm 8 can be corrected so that the precision can be improved. The determination result transmission unit 35 also acquires the determination result yielded by the inspection person in response to the result of non-destructive inspection of the inspection object 10 for which the determination unit 32 has not been able to make a determination. The determination result transmission unit 35 transmits the determination result yielded by the inspection person to the learning device 4 along with the result of non-destructive inspection of the inspection object 10 corresponding to the determination result. This reduces the number of cases in which the determination algorithm 8 cannot make a determination and improves the efficiency of non-destructive inspection. Thus, according to the inspection support system 1 of the embodiment, it is possible to stock precise knowledge by aggregating numerous determination results yielded by a competent inspection person in response to inspection results in a gray zone in which it is difficult even for an inspection person to make a determination and to reflect the stocked knowledge in the determination algorithm 8. Therefore, the more frequent the system is operated, the more improved the precision of preliminary determination by the determination algorithm 8 will be. Accordingly, the system can provide a far more precise and faster determination algorithm 8 than the determination by individual inspection persons.

The updating unit 37 acquires the determination algorithm 8 learned by the learning device 4 from the learning device 4 according to a predetermined timing schedule so as to update the determination algorithm 38. This makes it possible to perform non-destructive inspection even more efficiently by using the determination algorithm 8 with improved precision. Immediately after the operation of the inspection support system 1 is started, for example, the determination device 30 can make a determination only in cases in which it is easy to make a determination, and the inspection person may be relied upon for determination in a lot of cases. As sufficient amount of information is collected and learning in the determination algorithm 8 progresses, however, the determination device 30 will be able to make an accurate determination in a lot of cases until the inspection person need only make a simple final check.

The learning unit 36 learns the determination algorithm 38 based on the ultimate determination result yielded by the inspection person acquired by the ultimate determination result acquisition unit 34 and the result of non-destructive inspection of the object corresponding to the ultimate determination result. This can reinforce learning by the determination algorithm 38 of cases that often occur in individual plants 3, on the basis of the highly precise determination algorithm 8 in which the inspection record in a plurality of plants 3 is reflected and so can generate the highly precise determination algorithm 38 suited to the individual plants 3.

Described above is an explanation based on an exemplary embodiment. The embodiment is intended to be illustrative only and it will be understood by those skilled in the art that various modifications to constituting elements and processes could be developed and that such modifications are also within the scope of the present invention.

In the embodiment described above, radiographic testing is highlighted. However, non-destructive inspection to which the present invention is applicable is not limited to radiographic testing. For example, the invention is equally applicable to ultrasonic testing (UT), eddy current testing (ET), magnetic particle testing (MT), penetrant testing (PT), stress measurement (SM), acoustic emission (AE), infrared ray testing (IRT), etc.

Although the present invention has been described by way of exemplary embodiments, it should be understood that many changes and substitutions may be made by those skilled in the art without departing from the spirit and the scope of the present invention which is defined only by the appended claims.

What is claimed is:

1. An inspection support system for supporting non-destructive inspection of a welded part of a pipe, comprising:
a plurality of determination devices that determine pass or fail based on a result of non-destructive inspection of the the welded part of a pipe; and
a learning device that learns a determination algorithm used to determine pass or fail in the plurality of determination devices, based on information collected from the plurality of determination devices, wherein
the determination device includes;
an inspection result acquisition unit that acquires results of non-destructive inspection including an image of a plurality of welded parts of a pipe for which weather condition of a plant in which the pipe is installed, or diameter or quality of the pipe used varies;
a determination unit that determines pass or fail based on the result of non-destructive inspection of the welded part of a pipe acquired by the inspection result acquisition unit, using the determination algorithm;
a determination result presentation unit that presents the determination result yielded by the determination unit to an inspection person who performs non-destructive inspection of the welded part of a pipe; and
a determination result transmission unit that acquires an ultimate determination result yielded by the inspection person who has checked the determination result yielded by the determination unit and that transmits the ultimate determination result to the learning device along with the result of non-destructive inspection of the welded part of a pipe corresponding to the ultimate determination result, and wherein
the learning device includes:
a determination result reception unit that receives the ultimate determination result yielded by the inspection person and the result of non-destructive inspection of the welded part of a pipe corresponding to the determination result;
a learning unit that learns, by learning an image pattern characteristic of a damage or a defect that could occur in the welded part of a pipe based on information received by the determination result reception unit, the determination algorithm for determining pass or failure in non-destructive inspection based on the pattern located in an image of the welded part of a pipe; and
a provision unit that provides the determination algorithm learned by the learning unit to the plurality of determination devices.

2. The inspection support system according to claim 1, wherein when the determination result yielded by the determination unit is corrected by the inspection person, the determination result transmission unit acquires the corrected determination result and transmits the corrected determination result to the learning device along with the result of non-destructive inspection of the welded part of a pipe corresponding to the corrected determination result.

3. The inspection support system according to claim 1,
the determination result transmission unit acquires the determination result yielded by the inspection person in response to the result of non-destructive inspection of the welded part of a pipe for which the determination unit has not been able to make a determination, and transmits the determination result yielded by the inspection person to the learning device along with the result of non-destructive inspection of the welded part of a pip corresponding to the determination result.

4. The inspection support system according to claim 1, wherein
the determination device further includes a learning unit that learns the determination algorithm based on the ultimate determination result yielded by the inspection person and the result of non-destructive inspection of the welded part of a pipe corresponding to the ultimate determination result.

5. A learning device comprising:
a determination result reception unit that receives, from a plurality of determination devices for determining pass or fail based on results of non-destructive inspection of welded parts of a pipe installed in a plurality of plants for which weather condition or diameter or quality of the pipe used varies, an ultimate determination result yielded by an inspection person who has checked a determination result yielded by the determination device and the result of non-destructive inspection including an image of the welded part of a pipe corresponding to the ultimate determination result;
a learning unit that learns, by learning an image pattern characteristic of a damage or a defect that could occur in the welded part of a pipe based on information received by the determination result reception unit, a determination algorithm for determining pass or failure in non-destructive inspection based on the pattern located in an image of the welded part of a pipe; and
a provision unit that provides the determination algorithm learned by the learning unit to the plurality of determination devices.

6. The learning device according to claim 5, wherein
when the determination result yielded by the determination device is corrected by the inspection person, the determination result reception unit receives the corrected determination result and the result of non-destructive inspection of the welded part of a pipe corresponding to the corrected determination result.

7. The learning device according to claim 5, wherein
the determination result reception unit receives the determination result yielded by the inspection person in response to the result of non-destructive inspection of the welded part of a pipe for which the determination device has not been able to make a determination, and the result of non-destructive inspection of the object corresponding to the determination result.

8. A determination device comprising:
an inspection result acquisition unit that acquires results of non-destructive inspection of of welded parts of a pipe installed in a plurality of plants for which weather condition or diameter or quality of the pipe used varies;
a determination unit that determines pass or fail based on the result of non-destructive inspection of the welded part of a pipe acquired by the inspection result acquisition unit, using the determination algorithm, the determination algorithm being provided from a learning device for learning, by learning an image pattern characteristic of a damage or a defect that could occur in the welded part of a pipe based on information received by the determination result reception unit, a determination algorithm for determining pass or failure in non-destructive inspection based on the pattern located in an image of the welded part of a pipe,
a determination result presentation unit that presents the determination result yielded by the determination unit to an inspection person who performs non-destructive inspection of the welded part of a pipe; and a determination result transmission unit that acquires an ultimate determination result yielded by the inspection person who has checked the determination result yielded by the determination unit and that transmits the ultimate determination result to the learning device along with the result of non-destructive inspection of the welded part of a pipe corresponding to the ultimate determination result.

9. The determination device according to claim 8, further comprising:

a learning unit that learns the determination algorithm based on the ultimate determination result yielded by the inspection person and the result of non-destructive inspection of the welded part of a pipe corresponding to the ultimate determination result.

* * * * *